July 9, 1929.　　W. A. WARBURTON ET AL　　1,720,066

PACKING

Filed Jan. 28, 1926

INVENTORS
Wallace A. Warburton
& Alfred J. Carmier
BY A. B. Bowman
ATTORNEY.

Patented July 9, 1929.

1,720,066

UNITED STATES PATENT OFFICE.

WALLACE A. WARBURTON AND ALFRED J. CORMIER, OF LONG BEACH, CALIFORNIA.

PACKING.

Application filed January 28, 1926. Serial No. 84,297.

Our invention relates to a packing for plunger or piston rods and the objects of our invention are: first, to provide a packing in which the mud, steam, water or the like from the cylinder is utilized for compressing the packing around the piston or plunger rod; second, to provide a packing of this class in which the principal packing member is resilient and composed of portions which are of harder material to facilitate the operation of the packing; third, to provide a packing of this class which is so constructed and shaped that the resilient packing portion is held and supported so that it tends to operate and expand only toward the plunger or piston rod; fourth, to provide a novelly constructed packing; fifth, to provide a packing of this class in which the principal packing member is sealed with the box portion; and, sixth, to provide a packing of this class which is very simple and economical of construction, durable, efficient and which will not readily deteriorate or get out of order.

Figure 1:
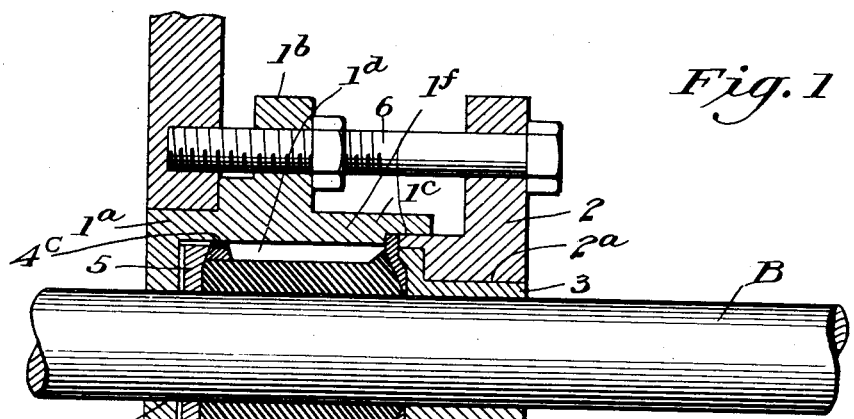
Figure 2:
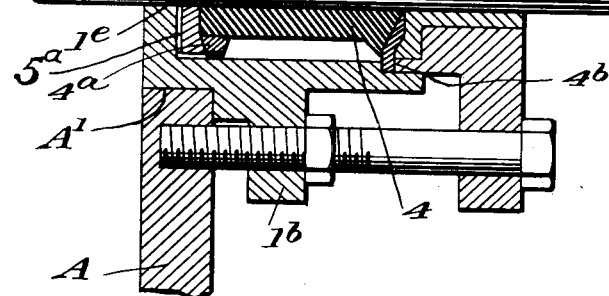
Figure 3:
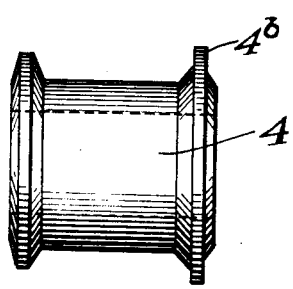
Figure 4:
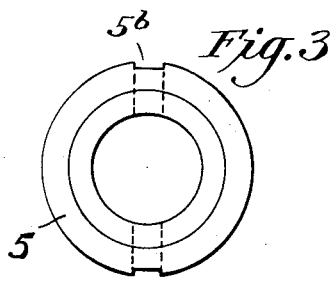

With these and other objects in view as will appear hereinafter, our invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a sectional view of our packing shown secured in position in a fragmentary portion of a cylinder head and showing some of the parts and portions in elevation to facilitate the illustration. Fig. 2 is a detail side elevational view of the principal resilient packing member. Fig. 3 is a side elevational view of the packing washer and Fig. 4 is a side elevational view of the opposite side of the said packing washer.

Similar characters of reference refer to similar parts and portions throughout the several views of the drawings.

The casing member 1, gland 2, bushing 3, resilient packing member 4, washer 5, and bolts 6, constitute the principal parts and portions of our packing. The casing member 1 is preferably secured in the cylinder head A, the cylinder head being provided with a hole $A^1$ adapted for a reduced extending portion $1^a$ of the casing 1 to fit into as shown best in Fig. 1 of the drawings. It is provided with an enlarged extended portion provided with extending lugs $1^b$ on opposite sides adapted for the bolts 6 and with an extended reduced portion $1^c$. It is provided centrally with a bore $1^d$ which extends to near the bottom of the casing and with another bore $1^e$ which extends from this bore to the bottom of the said casing, the latter bore $1^e$ being of the proper size to provide a close fit for the piston or plunger rod B. This casing is also provided with an enlarged bore $1^f$ near its outer side. Mounted in the bottom of this bore $1^d$ is a washer member 5 which is provided on its inner side with channels $5^a$ which extend from the rod B to the periphery of the said washer then extends across the edge at $5^b$. It will be noted that the opposite side of this washer member 5 is concave as shown best in Fig. 1 of the drawings. Mounted in the bores $1^d$ and $1^f$ and resting against the concave side of the washer 5 is the resilient packing member 4 which is a spool shaped resilient member preferably composed of rubber. It is adapted to fit the rod B snugly and the one end is provided with a convex surface adapted to fit the concave surface of the washer 5. The opposite end of this member 4 is also provided with a convex outer surface which is adapted to engage a similar surface of the bushing 3, it being noted that the bushing 3 is preferably a split bushing to facilitate its installation. The ends of the member 4 are convex so as to permit the ends thereof to be compressed inwardly against the rod B by correspondingly shaped adjacent sides of the washer and bushing. This split bushing 3 is mounted in a hole $2^a$ in the gland member 2 and rests against the end of the member 4. This gland member 2 is supported in position relatively to the casing 1 by means of tap bolts 6 and adapted to compress to a certain degree the member 4. The portions $4^a$ and $4^b$ of the member 4 are composed of a hard rubber substance which unites with the remainder of the member 4 which is of softer rubber. This provides a rigid portion supporting the softer rubber and causes the expansion toward the rod B instead of outwardly. Around the annular hard rubber portion $4^a$ is a yieldable rubber portion $4^c$ which normally engages the wall of the bore $1^d$, but is adapted to be depressed by the steam, water, or the like, under pressure, conducted through the channels $5^b$ for admitting the same into the space between the portions $4^a$ and $4^b$. Because of the small size of the channels $5^b$, the pressure of the water, steam, or the like, within the space between the portions 4ª and 4ᵇ, compresses the portion 4ᶜ against the adjacent face of the member 5 and the wall of the bore 1ᵈ preventing the escape of the water, steam, or the like, back into the cylinder when the pressure therein is lowered.

The operation of the packing is as follows: mud, water, steam or other substance from the pressure in the cylinder passes around the shaft through the channels 5ª and 5ᵇ and into the opening between the members 4ª and 4ᵇ depressing the portion 4ᶜ and this portion 4ᶜ closes the openings 5ᵇ and prevents the discharge of the substance under pressure therein, the pressure causing the member 4 to press against the rod B providing a tight packing which is constant.

Though we have shown and described a particular construction, combination and arrangement of parts and portions, we do not wish to be limited to this particular construction, combination and arrangement but desire to include in the scope of our invention the construction, combination and arrangement substantially as set forth in the appended claims.

Having thus described our invention, what we claim as new and desire to secure by Letters Patent is:

1. In a packing of the class described, a casing member provided with an internal bore, open at one end of the casing and provided with a head in the opposite end, a shaft extending through said bore and said head, there being a slight clearance between said shaft and the bore in the head through which said shaft extends, a washer mounted therein provided with a channel on one side and edge, said channel communicating with said clearance in said head, a resilient spool shaped member mounted in said bore with one end against said washer, a gland adapted to rest against the opposite end of the said spool shaped member from the said washer and adapted to compress said spool shaped member in said bore, the opposite ends of the said spool shaped member being convex and adapted to be forced inwardly by correspondingly shaped portions of and at the adjacent sides of said washer and gland.

2. In a packing of the class described, a casing member provided with an internal bore, open at one end of the casing and provided with a head in the opposite end, a shaft extending through said bore and said head, there being a slight clearance between said shaft and the bore in the head through which said shaft extends, a washer mounted therein provided with a channel on one side and edge, said channel communicating with said clearance in said head, a resilient spool shaped member mounted in said bore with one end against said washer, a gland adapted to rest against the opposite end of the said spool shaped member from the said washer and adapted to compress said spool shaped member in said bore, the opposite ends of the said spool shaped member being convex and adapted to be forced inwardly by correspondingly shaped portions of and at the adjacent sides of said washer and gland, the extended flange portions of the said spool shaped member being of harder rubber than the remainder of the said spool shaped member to permit the intermediate portion to be compressed.

In testimony whereof, we have hereunto set our hands at Los Angeles, California, this 20th day of January, 1926.

WALLACE A. WARBURTON.
ALFRED J. CORMIER.